United States Patent

Donley et al.

Patent Number: 5,822,611
Date of Patent: Oct. 13, 1998

[54] METHOD FOR CYCLE REQUEST WITH QUICK TERMINATION WITHOUT WAITING FOR THE CYCLE TO REACH THE DESTINATION BY STORING INFORMATION IN QUEUE

[76] Inventors: Greggory D. Donley, 999-3 Belmont Ter., Sunnyvale, Calif. 94086; Manoj Gujral, 444 Saratoga Ave., #3E, Santa Clara, Calif. 95050; Paul N. Israel, 434 S. Bernardo Ave., #2, Sunnyvale, Calif. 94086

[21] Appl. No.: 464,019

[22] Filed: Jun. 5, 1995

[51] Int. Cl.$^6$ .............................. G06F 13/38; G06F 13/14

[52] U.S. Cl. ........................ 395/826; 395/445; 395/481; 395/872; 395/859

[58] Field of Search ........................... 395/445, 455, 395/449, 468, 470, 473, 484, 478, 740, 826, 200.19, 292, 403, 444, 446, 447, 448, 450, 481, 495

[56] References Cited

U.S. PATENT DOCUMENTS

| | | | |
|---|---|---|---|
| 4,224,667 | 9/1980 | Lewis et al. | 395/826 |
| 4,546,430 | 10/1985 | Moore et al. | 395/740 |
| 4,558,429 | 12/1985 | Barlow et al. | 395/484 |
| 5,058,006 | 10/1991 | Durdan et al. | 395/449 |
| 5,319,766 | 6/1994 | Thaller et al. | 395/473 |
| 5,325,508 | 6/1994 | Parks et al. | 395/445 |
| 5,339,399 | 8/1994 | Lee et al. | 395/473 |
| 5,375,220 | 12/1994 | Ishikawa | 395/468 |
| 5,392,417 | 2/1995 | Iyengar et al. | 395/455 |
| 5,524,235 | 6/1996 | Larson et al. | 395/478 |
| 5,581,729 | 12/1996 | Nishtala et al. | 395/470 |

*Primary Examiner*—Meng-Ai T. An

[57] ABSTRACT

A method of arranging and operating a cache in a multi-processor computer system with N local processors, where a requesting device can request a cycle to be issued, where the method involves "posting" the "cycles", while also storing information for completing a cycle in a Queue and causing the requesting device to be issued "termination" immediately, rather than waiting for the cycle to reach its destination.

4 Claims, 6 Drawing Sheets

CACHE CONFIGURATION WITHIN SYSTEM

Figure 1

CACHE CONFIGURATION WITHIN SYSTEM

Figure 2

GOAL CACHE TAG ARCHITECTURE

PIPELINED READS: ADDRESS

Figure 5B

METHOD FOR CYCLE REQUEST WITH QUICK TERMINATION WITHOUT WAITING FOR THE CYCLE TO REACH THE DESTINATION BY STORING INFORMATION IN QUEUE

FIELD OF INVENTION

This disclosure relates to computer systems having cache memory, and more particularly to such having multiprocessors and parallel cache architecture.

BACKGROUND, FEATURES

Workers will attest that cache controller designs in multiprocessor systems are often a key to high performance. Also, a good way to achieve high overall system throughput is to promote parallel operations throughout the system wherever possible. And one of the best places to promote parallelism is within a cache controller/bus interface module.

An object hereof is to so teach "parallel" operation/structures in cache controllers, especially in multiprocessor systems; and more especially in a controller/bus interface module.

Other objects and advantages of the present invention will be apparent to those skilled in the art.

BRIEF DESCRIPTION OF THE DRAWINGS

The foregoing and other features and advantages of the present invention will be appreciated by workers as they become better understood by reference to the following detailed description of the present preferred embodiments, these being considered in conjunction with the accompanying drawings, wherein like reference symbols denote like elements.

DETAILED DESCRIPTION OF PREFERRED EMBODIMENT

Figure 1:
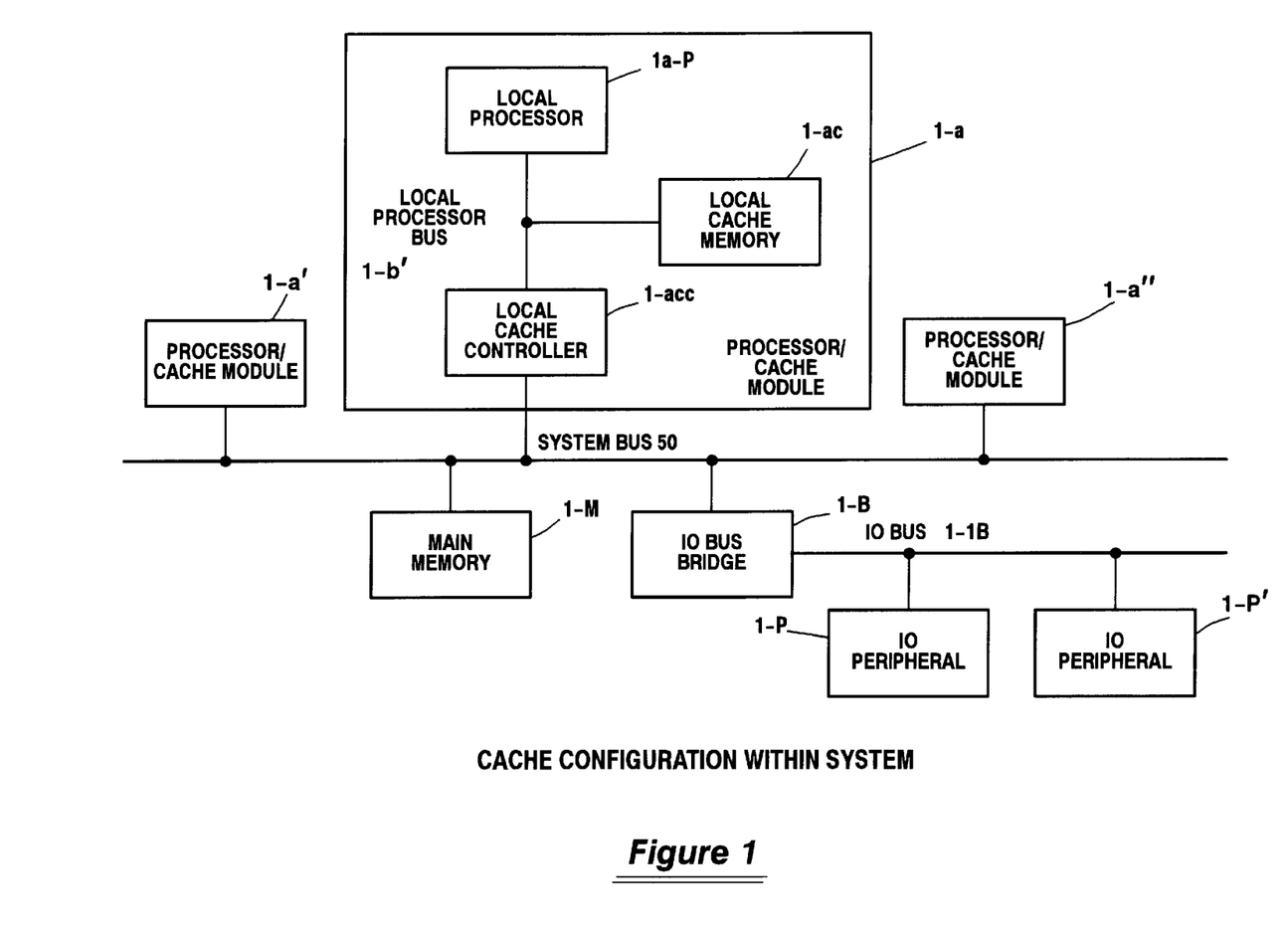
FIG. 1 is a very schematic block diagram of a computer system with multiple cache processor/cache modules.

Consider the case of a system, as in FIG. 1, with a number of processor/cache modules 1-a', 1-a", etc. (thus a "multiprocessor" computer system) coupled to one another, via a system bus sb, also to a main memory 1-M and to I/O means (via I/O bus Bridge 1-B, joining system bus sb to I/O bus 1-1B; I/O bus 1-1B is, in turn, coupled to a number of I/O peripherals 1-P, 1-p' (e.g., network controllers, SCSI controllers, serial ports, etc).

Each module 1-a etc. may be assumed as essentially the same, e.g., as depicted for processor/cache-module 1-a, having a local processor 1-aP, coupled suitably to an associated local cache memory 1-ac and related local cache controller 1acc (e.g., via a local processor bus 1-BL). And consider controller 1-acc as an administering external cache controller with a local cache memory 1-ac for the local processor. Controller 1-acc acts to interface the local processor bus to the system bus. The system bus connects to main memory, to bridges to IO busses, as well as to other processor/cache modules, as indicated.

Dual Cache Tags:

A cache controller, among other things, needs to implement a cache tag interface, which is responsible for performing cache tag lookups, determining the state and hit status of a lookup, and updating the tag entries, as needed. In the system under consideration, two basic tag operations are performed—tag lookups and updates for the local processor, and snoops of system bus cycles that access lines present in the local cache. For a single set of tags, access to the tag RAMs must be provided through a dual port mechanism which permits sharing of the tag RAMs between the local and system busses. This can cause significant loss of performance in one bus or the other, if one bus is in the middle of a tag sequence when the other bus requests access.

To alleviate this problem, a "dual-tag architecture" is here proposed, with each bus provided with its own tag RAM, which permits each bus to be serviced immediately. Tag access from each bus can occur in parallel, to thus have minimal impact on one another. Also, the system bus tag snooping can be used to screen-out any unnecessary coherency snoops to the processor, should it contain its own internal cache.

Figure 2:
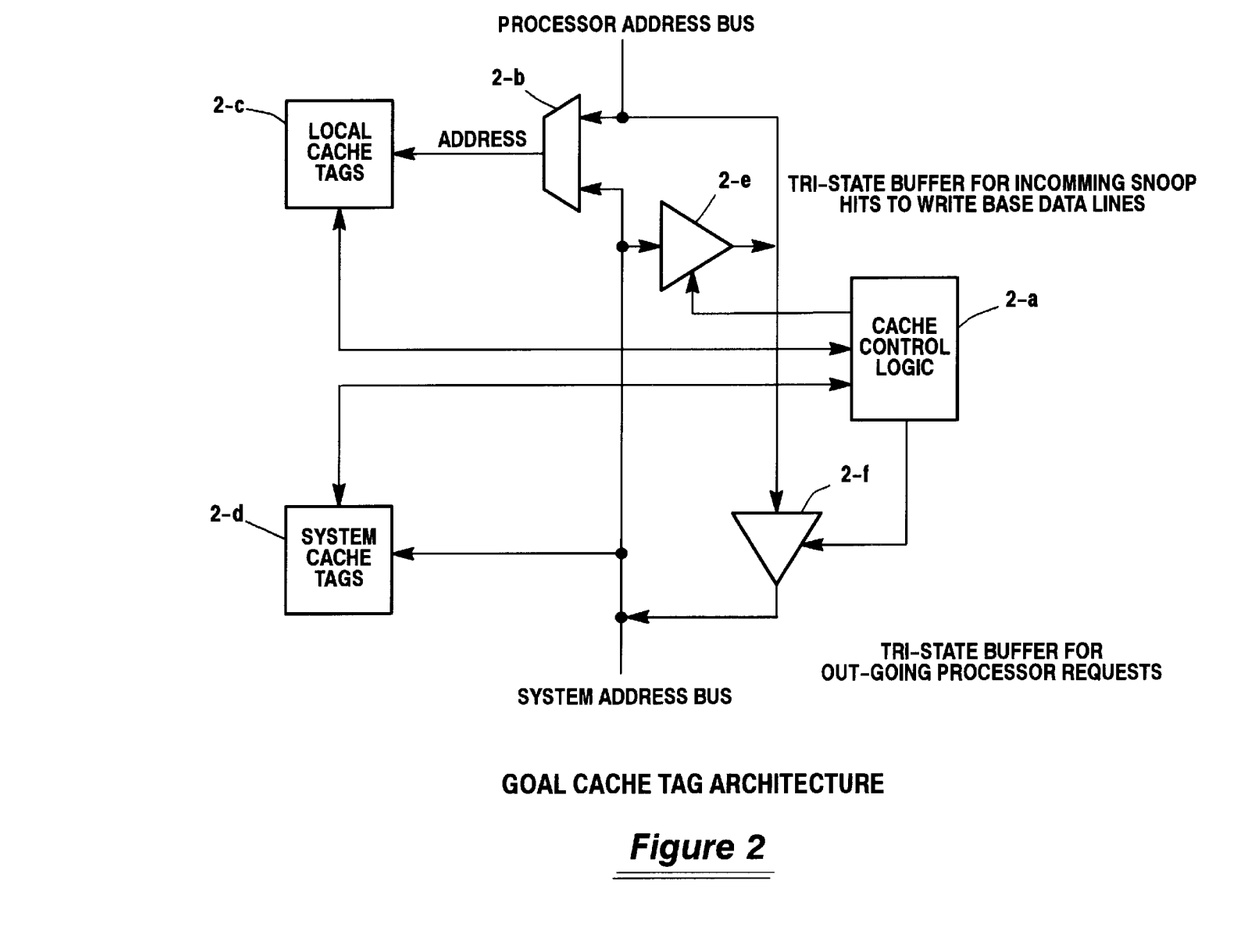
FIG. 2 is a block diagram of a dual cache tag architecture embodiment.

FIG. 2 depicts an illustrative "dual cache tag" architecture, shown between a processor address bus and a system address bus. Here, a cache central logic stage 2-a serves a pair of cache tag memory units (RAMs), one for local cache tags (2-c), the other for system cache tags (2-d). A pair of tri-state busses are provided for logic stage 2-a; one for "incoming snoop bits" (hits) to write-back "dirty lines"; the other for outgoing processor requests (to system address bus, via tri-state buffer 2-f).

Mux 2-b is used to select between "system" and "processor" busses for local cache tag operations. The system bus is selected to update the local tags in the event of a "system tag snoop hit"; otherwise the processor bus is selected (normally) to service cache cycles from the processor. A tri-state buffer 2-e is used for incoming snoop-hits to write-back dirty lines to drive system cycle addresses onto the processor bus to the cache data RAMs 1-ac during "write-backs"—as well as "back-snoops" to the processor (if it controls its own internal cache).

Buffer 2-f is used for outgoing processor requests (will be "non-inverting" if no control line).

To some extent, the local bus tag (e.g. 2-c) still acts as a dual ported tag (as usual), but here it only services those system bus snoops which actually hit a cache line in the local cache; all others are screened off by the system bus tags (see 2-d). This greatly enhances processor bus throughput.

The system bus tag 2-d is used primarily for snooping other system bus modules' cycles for cache hits to its own local cache memory. If a hit occurs from a read allocation, and the line is "dirty" (i.e., where the cache contains a cache-line which the local processor has written-to, yet without updating MAIN memory), the cache controller schedules a write-back sequence for the processor bus. If a hit occurs from a write allocation or an ordinary write, and the line is "dirty", the cache controller schedules a write-back sequence for the processor bus, which will also invalidate the cache tag entry. If a hit occurs from a write allocation or an ordinary write, and the line is "clean", the cache controller schedules a processor tag invalidation. For each of these cases, the bus tag state is updated immediately. Once the cycle reaches the processor bus, it performs any local snoop cycles needed for internal processor caches, performs any required write-back sequences, and updates the local processor tag.

The local bus tag 2-c is used primarily for checking the cache line status for processor reads and writes. If a read or write hit occurs. the cache controller will try to service the request immediately, entirely on the local bus. If a miss is detected, the cache controller will schedule the appropriate read or write allocation cycle for the system bus, and fetch the needed cache line from main memory. When the allocation cycle is generated on the system bus, the bus tag is updated simultaneously for the new cache line. When the cache line is filled into the local cache memory, the local tag is updated. (By waiting for the fill data to arrive before updating the local cache tag, it becomes possible to force the processor off the local bus to allow the cache controller to perform intervening snoop cycles from the system bus; when the cache controller releases the local bus again, the processor can reconnect and restart the interrupted cycle right where it left off, with the same "tag-lookup" result.)

During the course of servicing a local read or write miss, the cache controller may detect that the cache tag entry contains a valid entry for a different line. This will generate the need for a line replacement sequence if the line is "dirty". Since a miss condition will force a read or write allocation out to the system bus, this cycle can be used to snoop the bus tag for a "replacement condition", and update the bus tag for the new line simultaneously. Once the "replacement condition" is detected, the cache controller schedules a write-back sequence on the local bus, updates the local cache entry to an invalid state, and transmits the write-back to main memory on a later system bus cycle. (Note: all this can occur in parallel with the allocation sequence on the system bus—"allocation" will be understood as the fetching of a needed cache line from MAIN memory, resulting from a "cache miss"). The cache controller must be able to force the local processor off the local bus in mid-cycle, before the allocation is complete. It must then perform the local portion of the write-back sequence before the allocation line is written to the cache memory, or the dirty line being replaced will be overwritten. Once the local portion of the write-back is finished, the cache controller can store it in a buffer internally, and then transmit it to the system bus once the allocation sequence is completed. [Also note that once the bus tag has been updated, the dirty cache line must be tracked separately for future system bus snoops until the write-back to system memory is complete.]

Figure 3:
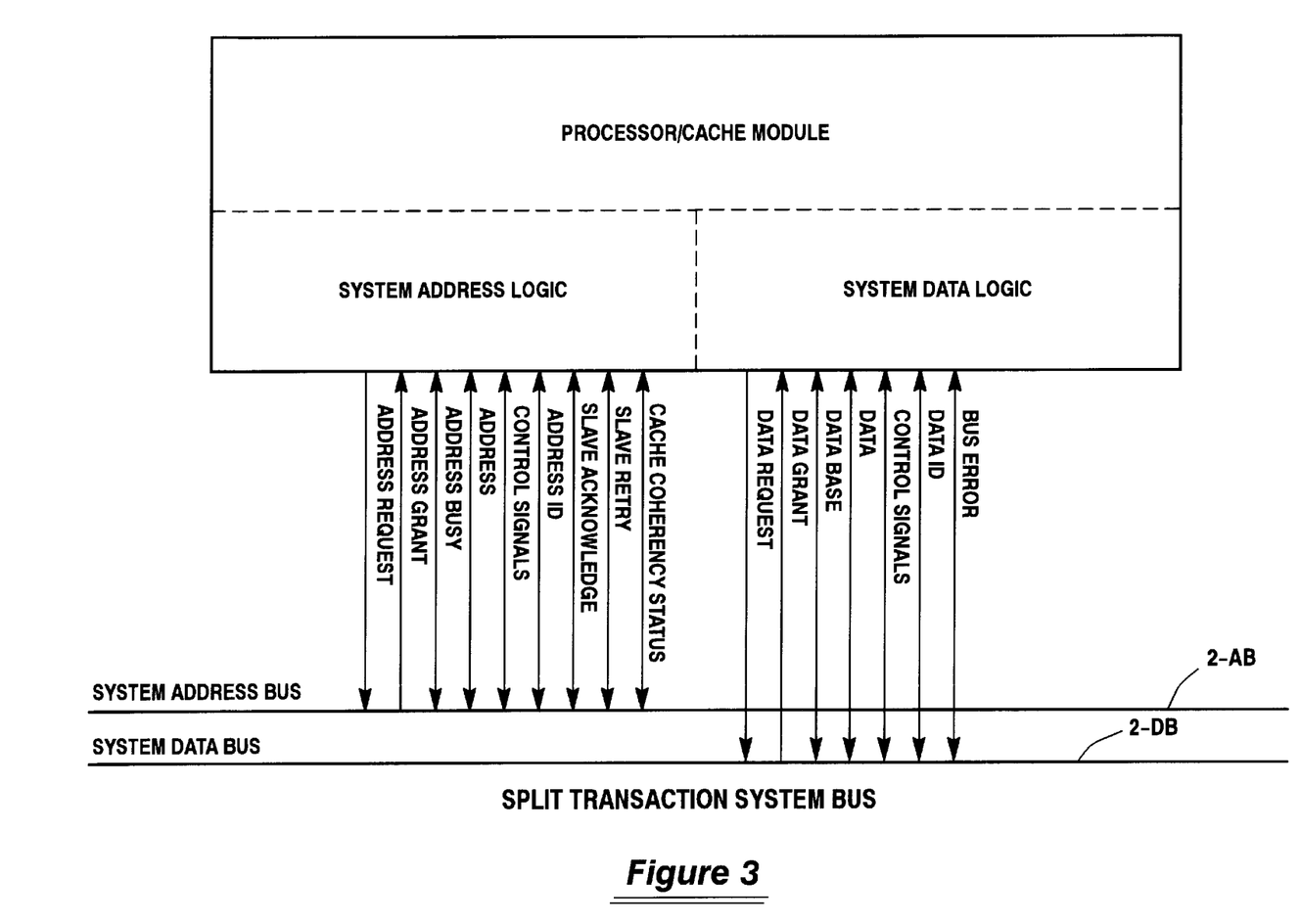
FIG. 3 depicts a related "split transaction system bus.

Split Transaction Busses:

System throughput can be greatly enhanced through the use of "split transaction" busses (e.g., see FIG. 3). A split transaction bus separates a bus cycle into separate address and data phases, which are run semi-independently on separate bus interfaces. Each bus interface is separately arbitrated for that portion of the cycle run, then that bus is released, so that another bus module can begin its own cycle sequence. Cycles do not generate "wait states"—instead, if a resource is not immediately available, it issues a "retry response" to the requesting device, which responds by retracting the address cycle, relinquishing the address bus, and restarting the whole cycle at some later time.

To illustrate, please note FIG. 3, depicting a processor/cache module having semi-independent control logic blocks for system address logic and system data logic. The system address logic may be understood as coupled to "system address bus" means 2-AB for such data exchange signals as: "address", address-busy, address-grant, address request, address ID, control signals, slave responses (e.g., retry, acknowledge) and cache coherency status.

The system data logic may be understood as coupled to "system Data Bus" means 2-DB for data exchange, e.g., re bus error, data signals (e.g., -ID, -request, -grant, -busy), control signals, etc.

Typical Sequence (FIG. 3):

A typical sequence on such a split transaction bus (FIG. 3) would consists of address bus arbitration, address bus cycle transmission, address cycle completion responses, data bus arbitration, and data cycle transmission. The bus device requesting the cycle would perform the address cycle, while the device supplying the data (which may or may not be the same device) would perform the data cycle. Transmissions for different cycles can overlap on the two parts of the bus. Also, arbitration for a bus by a particular cycle can overlap transmission on the same bus of a prior cycle.

By transmitting each half of the cycle with a cycle identification number, the master and slave devices involved in a particular transfer can pair-up a data transfer with its corresponding address. If each bus device generates unique identification numbers for its cycles, then it becomes possible to support "out-of-order" completion of data cycles. This would allow bus devices to wait until data is actually ready for transmission before requesting data bus access, thus keeping the data bus free the rest of the time for other devices, as needed. This "cycle ID" technique also gives each bus module the ability to initiate multiple address cycles (on the bus) before the prior data cycles have completed. Consequently, multiple cycles from each bus device can be serviced within the system in parallel.

Cycle States:

A cycle which is waiting to begin its address sequence is considered "pending". Once an address sequence is successfully completed, a cycle is considered "opened". Once the corresponding data sequence is successfully completed, the cycle is considered "closed".

While a cycle is in "open", separate system bus snooping tags must be provided for each cycle that the cache presently has open. These are used to track the current status of the cache lines that the corresponding cycles are accessing. Any cacheable address cycles from other system bus modules must be snooped for hits by these cycle tags, and in parallel to the usual bus tag snoop. If a hit is generated to an open bus cycle, the new cycle is issued a "retry response" as part of the address cycle completion response. The requesting device must retract the address cycle, relinquish the address bus, and try the cycle again at some later time. Once a bus cycle is "closed", the corresponding cycle tag entry is cleared. Buffered Cycles:

Another means of increasing parallelism is by implementing "posted cycles": i.e., a cycle in which all the information necessary for completing the cycle is stored into a buffer or queue, and the device requesting the cycle is issued "termination" immediately, instead of waiting for the cycle to reach its final destination.

The most common form of "posting" is "write-posting" from the local processor. The write address and data are stored into a buffer, and the processor is issued an immediate cycle termination. As a result, the processor can continue on with other cycles, while the cache controller processes the "posted write" in parallel. (Note: until the "posted write" is complete, a status signal is activated to the processor to inform it that an externally posted write is still in progress. If the processor has an internal cache, it uses this signal to delay generating writes to its internal cache until the signal is cleared. This is necessary to maintain strong "write-ordering" between the internal and external caches; "write-ordering" will be understood, generally, as the sequencing of write-commands issued by a processor (e.g., to a memory);

and "strong" write-ordering means that the "writes" are kept in the order issued.)

The write buffer concept can be extended into a "multiple-entry queue". Each queue entry is processed in first-in, first-out (FIFO) order to maintain "strong write ordering".

"Strong write-ordering" should insure that: (a) each "write" issued will be stored into memory (either cache or MAIN memory) in the order issued by the processor; and (b) any "read" issued after a "write" to the same address by the same processor will be supplied data resulting from the previous "write". (Note: "reads" may be re-ordered in front of non-conflicting posted "writes".)

When a write queue entry reaches the end of the queue, it becomes the "current entry", and gets serviced. A "posted write" might consist of a write to the system bus, or a cacheable write allocation on the system bus. For a simple "write", the write queue is advanced once the data transfer is completed on the system bus. For a "write allocate", the write queue is advanced when the required cache line has been loaded into the local cache memory. If the write queue fills up and the processor issues an additional write, the processor must be issued "wait states" until an entry is freed-up to contain the new cycle.

The cache controller can also post snooped system bus cycles that hit a line in the local cache memory. For example, a read or write allocate cycle from another cache controller might require a write-back sequence of a dirty cache line in the local cache memory, and/or an update or clearing of the corresponding cache tag entry. The addresses of these snooped cycles can be stored in a holding buffer, and scheduled for servicing on the processor bus, while issuing an immediate termination signal to the requesting cache controller on the system bus. The system bus tag will be updated immediately, and the local bus tag will be updated when the cycle is serviced on the processor bus. If a simple tag update is required, the buffer will be cleared when the local bus tag has been rewritten. If a write-back sequence is required, the buffer can be cleared once the data has been transmitted to the system bus. (Note: one could also provide holding buffers for the data; this would enable clearing of the address holding buffer as soon as the data has been posted into this data holding buffer.)

Once again, the holding buffer for the snooped cycles can be extended into a "multiple-entry queue". As each entry completes processing, the queue is advanced to service the next entry. If the queue is "full" and a new system bus cycle is issued that produces another snoop hit, the cycle must be issued a "retry response" as part of the address cycle termination response. The requesting device must retract the cycle from the bus and try again later on, by which time an empty slot may be available in the snoop queue.

To optimize performance, independent state machines should be used to process each end of a queue. One machine is responsible for determining the need to load an entry, and does so; the other detects the presence of an entry at the end of the queue, and services it, ultimately clearing the entry and advancing the queue. These state machines run in parallel, maximizing performance.

Figure 4:
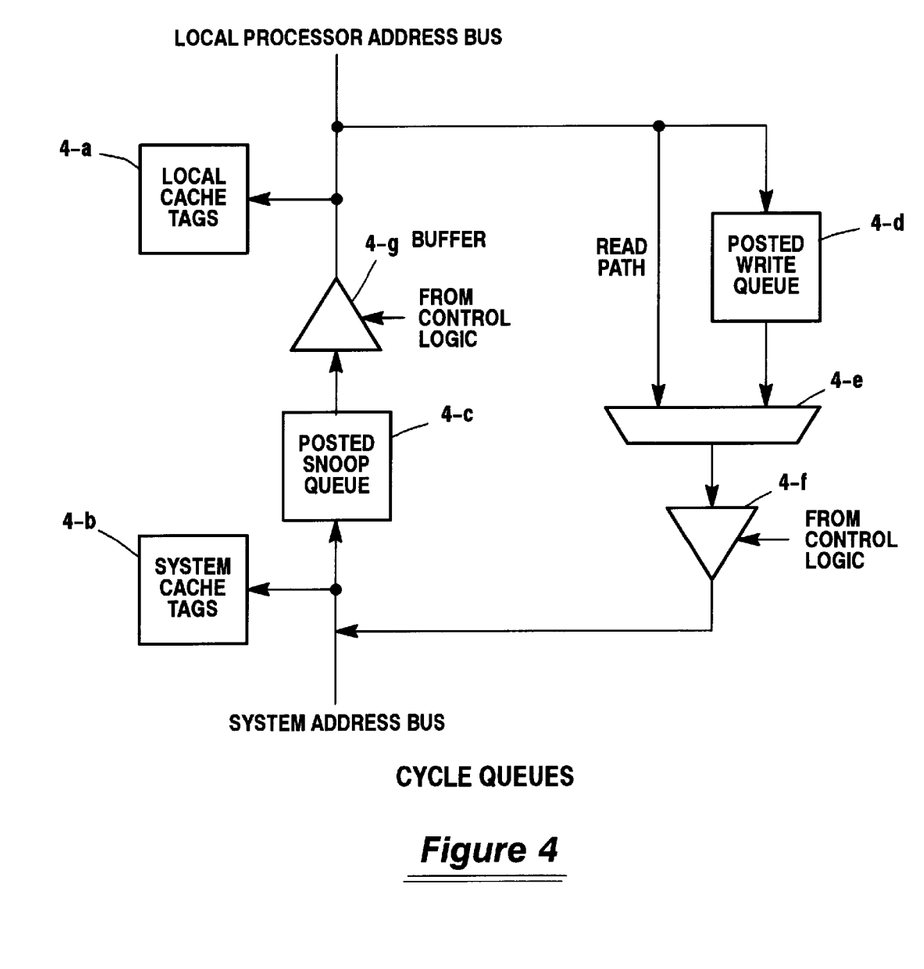
FIG. 4 shows a "queued" implementation of FIG. 2.

To illustrate "cycle queues", please note FIG. 4 showing a "queued" implementation of FIG. 2, i.e., a dual cache tag array, between a local processor address bus and the system address bus, with a "Local Cache Tags" RAM 4-a and a "System Cache Tags" RAM 4-b (compare FIG. 2 "dual cache tag architecture"), a "posted snoop queue" unit 4-c; using buffer 4-g (like 2-e, under control of signals from control logic) and a "Posted Write Queue" stage 4-d, outputted to a "two-to-one" MUX 4-e, along with read path signals, these applied via a tri-state buffer unit 4-f (under control of signals from control logic).

Processor Pipelining:

If a processor can support "pipelined reads" (e.g., see FIG. 5: "pipelined reads") such that the data transfer of the first read overlaps the address transmission of the second read—then a cache controller can take advantage of the afore-indicated parallelism. Typically, reads must be completed in order, such that the data is delivered to the processor in the same order it was requested. This means that a cache controller servicing two read misses in a row must ensure that, if the system bus delivers the two read allocated cache lines in the wrong order, it buffers the second line internally until the first line arrives, and is delivered to the processor. (In essence, this is very similar to "write posting".) If a read hit is followed by a read miss, the read hit data can be supplied immediately, while the read miss is prepared for transmission to the system bus in parallel.

A "read hit" followed by a "pipelined write" will achieve little, since the data for the write cannot be accessed until the data for the read has been supplied to the processor. A "read miss" followed by a "pipelined write" is completely pointless, since the processor will have to be forced off the bus to complete the read's cache line fill to the local cache memory,—and this will prevent any servicing of the write cycle until the entire "read allocate" sequence is finished. Since writes will generally be posted immediately, a write followed by a pipelined write doesn't achieve any significant degree of additional parallelism, and should be avoided; likewise for a "write" followed by a "read".

Figure 5A:
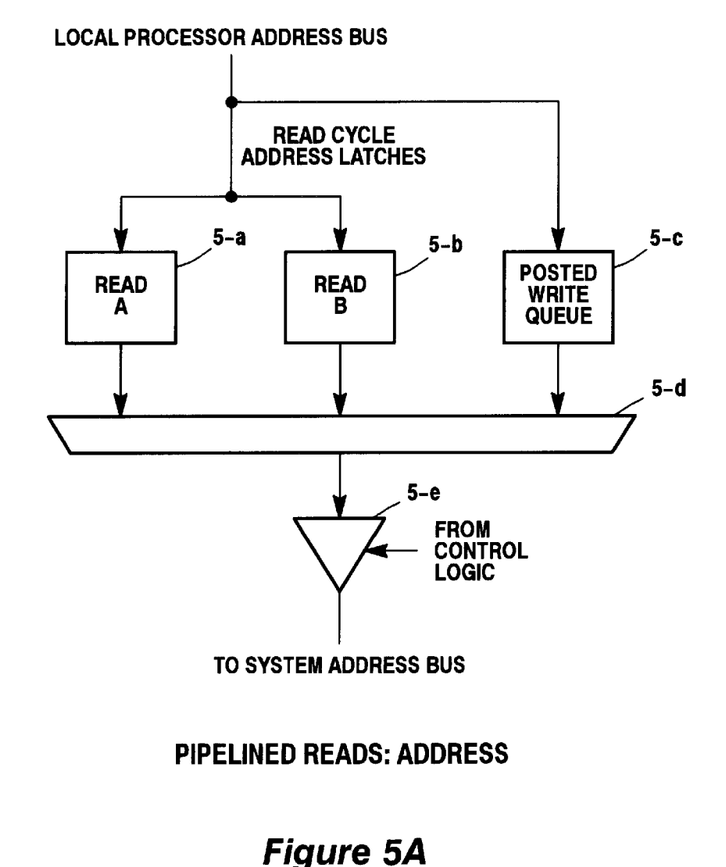
FIGS. 5A and 5B illustrate related "pipelined read architecture", with FIG. 5A showing the address portion and FIG. 5B the data portion.
Figure 5B:
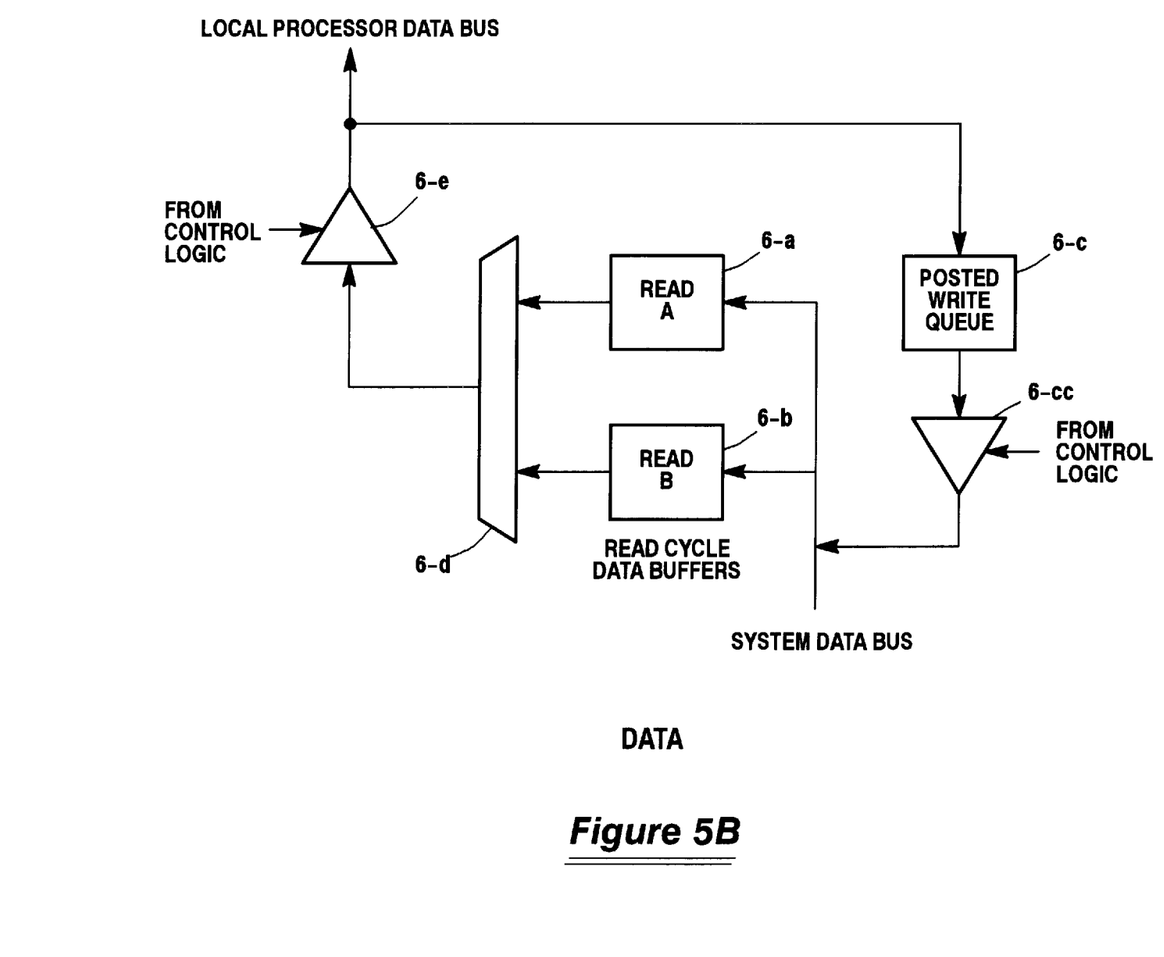

In light of the foregoing, consider FIG. 5: "pipelined read architecture" that supports up to two "open reads", as well as "posted writes" [Address portion in FIG. 5A, data portion: FIG. 5B.] In FIG. 5A, a local processor address bus is depicted as feeding a Posted Write Queue unit 5-c, in parallel with a pair of address buffer units (read cycle address latches): Read A (5-a) and Read B (5-b) accepting signals therefrom which are "read cycle address latched". The output from units 5-a,5-b,5-c is sent, in parallel, to 3 to 1 MUX stage 5-d, and thence, via tri-state buffer 5-e (operated by control logic) to the system address bus. FIG. 5B shows like units coupling the system data bus to local processor data bus.

Parallel Dependencies:

With all these operations occurring simultaneously, certain ordering problems will inevitably develop as two or more of these sequences try to access the same address or cache line at the same time. Those cycles which are dependent on the completion of other cycles must check for these dependencies and wait for them to clear before proceeding.

On the processor side, a cacheable read should check any "posted writes" in the write queue for addresses which access the same cache tag. The write operation may result in a line replacement "write-back" or other modification of the tag, and since the write occurred first, it must be allowed to finish before the read. Likewise, if that same read accesses the same cache line as a pending cache line replacement, then, again, the read should be made to wait. Once these dependencies clear, the read may proceed for further servicing. A cacheable write need only avoid colliding with the same cache line as a pending line replacement cycle, before being eligible for posting into the write queue (e.g., see FIG. 5).

Once a read- or write-allocate is ready for servicing, the cache controller must check to see if there is a need for a replacement write-back sequence. If so, and a write-back buffer is not available due to a prior replacement being serviced, the read or write must wait until the new replacement sequence can be initiated.

Also, if a posted snoop write-back from the system bus accesses the same cache tag as a pending read or write cycle, the read or write cycle should be delayed until after the snoop has been processed. The snooped cycle may impact the need for a replacement sequence.

The system bus acts as the ultimate arbiter concerning the ordering of cycles in the system. To maintain "system cycle order", when an invalidation is pushed into the posted snoop queue, the cache controller must track that queue entry relative to any local processor reads and writes which are serviced after that point. Consequently, if a read or write allocation cycle is generated on the system bus by the local processor while the invalidation is still pending in the queue, it must take care to flush the invalidation before the allocation sequence completes and releases the local bus to the processor. Otherwise, if the processor is allowed to initiate a new cycle which hits the same line as the pending invalidation, it will access "stale" data from its local cache.

Once a cacheable read or write, or line replacement sequence, begins on the system bus, the corresponding cycle tags are loaded, and used to avoid conflicts with other system bus cycles—by issuing retry responses when a cycle tag hit is detected. This occurs until the entire cycle sequence is complete. Other cacheable cycles will be handled normally through the bus tag snooping process.

For noncacheable reads, all prior writes in the write queue should be flushed; but noncacheable writes can be safely posted to the write queue, since all the prior writes already posted are guaranteed to finish beforehand. No other dependencies exist for any noncacheable cycles.

REPRISE:

Workers will appreciate the novel features here taught, such as: multiple cycles serviced in parallel, completion of "out-of-order" cycle on a system bus and use of cycle tags to enforce memory coherence across "split-transaction" system bus means.

Of course, many modifications to the preferred embodiments described are possible without departing from the spirit of the present invention. For example, there are many different ways to provide controls as described in the present invention, and it is not limited to the particular types of storage or control means described. Additionally, some features of the present invention can be used to advantage without the corresponding use of other features.

Accordingly, the description of the preferred embodiment should be to be considered as including all possible modifications and variations coming within the scope of the invention as defined by the appended claims.

What is claimed is:

1. A method of arranging and operating cache means in a multi-processor computer system including N local processor means, where a requesting device can request a cycle to be issued, said method comprising: "posting" the "cycles", including 'write-posting' while also storing information for completing a cycle in Queue means and causing said requesting device requesting a cycle to be immediately issued "termination" rather than waiting for the cycle to reach a destination, and wherein said 'write-posting' is implemented by storing write address bits and write data bits from said local processor means into buffer means, and causing said local processor means to immediately issue 'cycle termination', and be free to thereafter proceed with other cycles.

2. The method of claim 1, wherein a cache controller of said local processor processes said 'write-posting' in parallel.

3. The method of claim 2, wherein said local processor means has internal cache means, and said local processor means issues a status signal thereto to indicate when an "externally-posted" write is in-progress, to thereby delay generating writes until said status signal is "cleared".

4. A method of arranging and operating cache means in a multiprocessor computer system including N local processor means, where a requesting device can request a cycle to be issued, said method comprising: "posting" the "cycles" including write-posting by storing write-address bits and write data bits from local processor means into buffer means, while also storing information for completing cycle in Queue means; and then causing said local processor means to immediately issue "cycle termination", and be free to thereafter proceed with other cycles, while a cache controller of said local processor means processes the 'write-posting', rather than waiting for the cycle to reach a destination;

wherein said local processor means having internal cache means and issues a status signal thereto to indicate when an "externally-posted" write is in-progress, to thereby delay generating writes until said status signal is "cleared"; and wherein "multiple-entry queue" means is used when each posting entry is processed on FIFO basis to maintain "strong" write-ordering.

* * * * *